United States Patent

[11] 3,604,965

| [72] | Inventor | Richard S. Stroud |
| | | Kokomo, Ind. |
| [21] | Appl. No. | 19,436 |
| [22] | Filed | Mar. 13, 1970 |
| [45] | Patented | Sept. 14, 1971 |
| [73] | Assignee | General Motors Corporation |
| | | Detroit, Mich. |

[54] DOUBLE MAGNETIC ALTERNATE PATH SIGNAL GENERATOR
5 Claims, 4 Drawing Figs.

[52] U.S. Cl. .................................................. 310/155,
310/67
[51] Int. Cl. .................................................. H02k 21/38
[50] Field of Search .................................................. 310/155,
156, 162, 4, 8, 9

[56] References Cited
UNITED STATES PATENTS
3,283,190  11/1966  Applegate ..................... 310/162
3,469,133  9/1969  Stcherbatcheff ............. 310/164

*Primary Examiner*—D. X. Sliney
*Attorneys*—Jean L. Carpenter and Paul Fitzpatrick ABSTRACT: A signal generator having a stator and a rotor in which either the stator or the rotor is comprised of two members each having teeth around its periphery. The two members are positioned such that the teeth on the two members are out of phase with each other. Two permanent magnets are provided wherein each one is associated with one of the toothed members. The remaining stator or rotor has teeth confronting the teeth on the two members such that when the rotor is rotated, alternate magnetic paths are provided for each of the magnets. A coil is associated with the two members such that when the rotor is rotated, changing flux which results from the providing of alternate paths for the flux output of the permanent magnets induces a voltage in the coil corresponding to the changing flux and, therefore, the rotation of the rotor.

PATENTED SEP 14 1971 3,604,965

INVENTOR.
Richard S. Stroud
BY Paul Fitzpatrick
ATTORNEY

DOUBLE MAGNETIC ALTERNATE PATH SIGNAL GENERATOR

This invention relates to a signal generator and more particularly to a signal generator having two magnets, each of which is associated with a respective toothed member both of which cooperate with another toothed member to provide alternate flux paths for the magnets.

Single magnet alternate path signal generators are known in the art. An example of such a signal generator is shown in U.S. Pat. No. 2,651,734. In such a signal generator, two magnetic flux paths are alternately provided for the output of the magnet. One is a generating path which includes a generating coil and the other is a shunt path which bypasses the generating coil. This method of generating a signal has distinct advantages over the conventional method in which a voltage is induced in a coil merely by varying the reluctance of a single path including the source of magnetic flux. The primary advantage is that a relatively high output voltage can be obtained in the alternate path device at low rotational inputs to the rotor of the signal generator.

Although the single magnet alternate path signal generator has distinct advantages over the conventional signal generator, it does have a number of disadvantages. One of these disadvantages is that the average flux through the generating path which includes the generating coil is some magnitude other than zero. The flux through the generating path can vary from zero at best to some peak value and back to zero. The quantity of metal in the generating path must be great enough to carry the peak value of flux without saturation to provide a maximum output from the generating coil. Another disadvantage is that saturation effects can occur on the teeth tips in the shunt path which tend to decrease the magnitude of the output of the signal generator.

It is the general object of this invention to provide a double magnet alternate path signal generator.

It is another object of this invention to enhance the high output at low rotational input characteristic of an alternate path signal generator.

It is another object of this invention to reduce tooth tip saturation in an alternate path signal generator.

It is another object of this invention to provide for a signal generator which will provide an increased output while yet allowing a reduction in the quantity of metal in the generating path of the signal generator.

The objects of this invention are accomplished by providing an alternate path signal generator with two magnets which are properly phased. A shunt path is provided for the first magnet while a generating path is provided for the second magnet, and conversely, when a shunt path is provided for the second magnet, a generating path is provided for the first magnet. The direction of the flux through the generating path for one magnet is opposite to the direction of the generating flux for the other magnet. In this manner, the average flux through the generating path is zero. This permits the use of less metal to carry the flux through the generating path and results in a decrease in size of the signal generator. Since each magnet is only required to produce one-half the flux through the generating path as the magnet in the single magnet alternate path generator in order to obtain an output signal having the same magnitude, each magnet can be reduced in size. This has the effect of decreasing the flux through the shunt paths. The result is enhanced operation of the signal generator by eliminating teeth saturation and permitting a larger output signal to be obtained.

The invention may be best understood by reference to the following description of a preferred embodiment and the following diagrams in which.

The following description relates to a signal generator in which the inner member is mounted on a shaft and held stationary while the outer shell is rotated by a rotating member.

Figure 1:
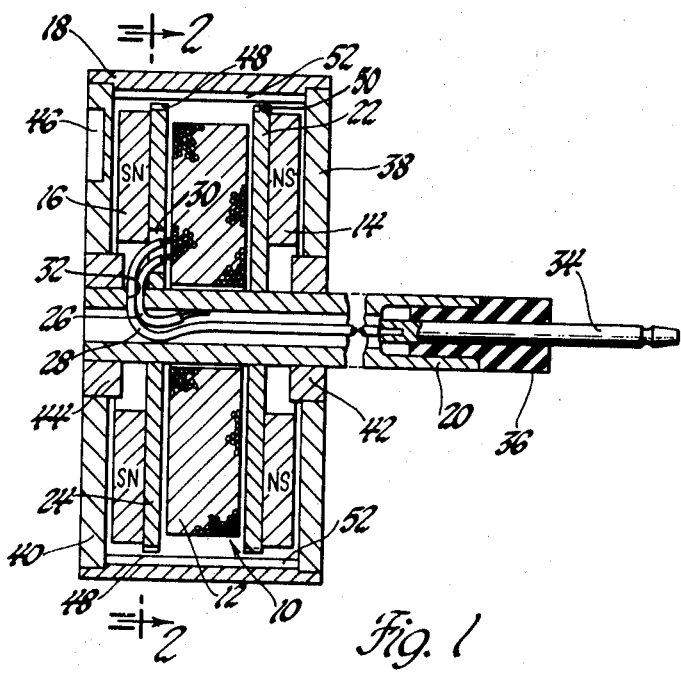
FIG. 1 is a schematic diagram of a signal generator incorporating the principles of this invention.

Referring to FIG. 1, a signal generator is generally comprised of a stator 10, a stator coil 12, a permanent magnet 14, a permanent magnet 16, a rotor 18, and a hollow shaft 20.

The stator 10 is comprised of a disk 22 and disk 24 secured to the outer surface of the shaft 20. The stator coil 12 is positioned within the confines of the disks 22 and 24 and around the shaft 20. The magnets 14 and 16 are annular magnets and are secured respectively to the disks 22 and 24 with their respective north and south poles positioned as shown. The stator coil 12 has two leads 26 and 28 which pass through an opening 30 in the disk 24 and an opening 32 in the shaft 20. The lead 26 is grounded to the shaft 20 and the lead 28 is connected to a terminal 34 which is secured to the shaft 20 by an insulator 36. The shaft 20 and the disks 22 and 24 are composed of material having magnetic properties so as to provide flux paths for the magnets 14 and 16.

The rotor 18 is supported by a pair of end caps 38 and 40 comprised of material having magnetic properties. The end caps 38 and 40 are rotatably supported on the shaft 20 by means of the annular bearings 42 and 44. The bearings 42 and 44 are comprised of a nonmagnetic material so as not to conduct magnetic flux. A drive slot 46 is provided in the end cap 40 by which the rotor 18 is rotated about the stationary shaft 20.

The spacing between the permanent magnets 14 and 16 and the respective end caps 38 and 40 is made small so as to provide a low reluctance magnetic path between the magnets 14 and 16 and the respective end caps 38 and 40.

Figure 2:
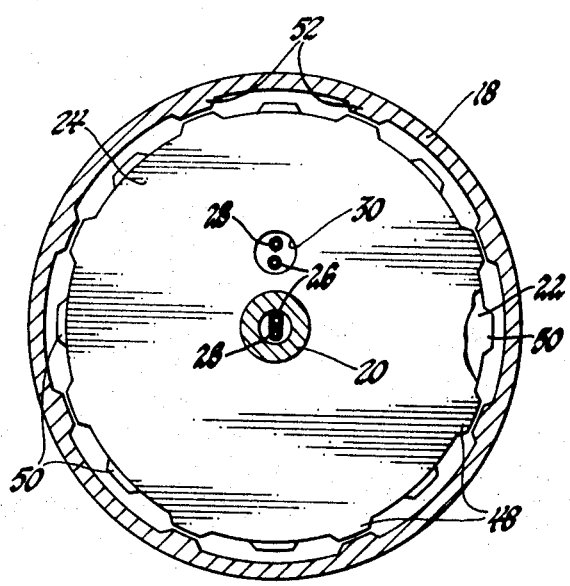
FIG. 2 is a sectional view taken along lines 2—2 of FIG. 1.

Referring to FIGS. 1 and 2, the stator disk 24 has a series of teeth 48 equally spaced about its outer periphery. The stator disk 22 also has teeth 50 equally spaced about its outer periphery. The number of teeth on the stator disk 22 is equal to the number of teeth on the stator disk 24. The stator disk 22 is positioned with respect to stator disk 24 such that their teeth are out of phase as shown on FIG. 2.

The rotor 18 has a series of teeth 52 confronting the teeth on the stator disks 22 and 24 such that as the rotor 18 is rotated, a low reluctance path is defined between the rotor and the stator disk 24 while a high reluctance path is defined between the rotor and the stator disk 22 and alternately a low reluctance path is provided between the rotor 18 and the stator disk 22 and a high reluctance path is defined between the rotor 18 and the stator disk 24. These conditions exist when the teeth 52 on the rotor 18 are alternately in correspondence with the teeth 48 on the disk 24 and the teeth 50 on the disk 22.

Figure 4:
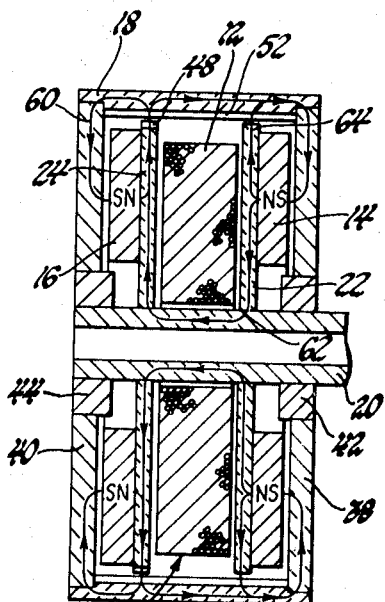
FIG. 4 is a schematic diagram of the double magnet alternate path signal generator illustrating its operation when the alternate set of teeth are aligned.
Figure 3:
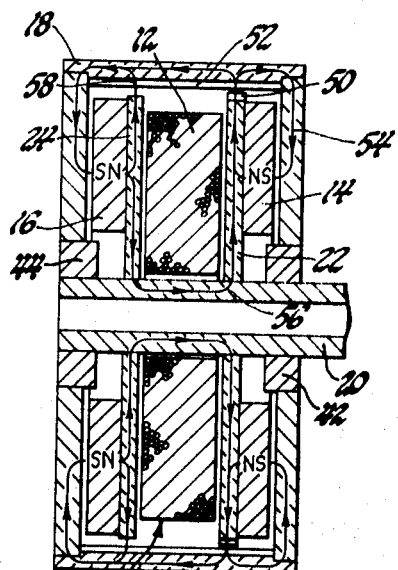
FIG. 3 is a schematic diagram of the double magnet alternate path signal generator illustrating its operation when the teeth are aligned as shown in FIG. 2.

The operation of the double magnet alternate path signal generator will be described with reference to FIGS. 2, 3 and 4. When the teeth 52 of the rotor 18 are aligned with the teeth 50 of the disk 22, a low reluctance gap is defined between the rotor 18 and the disk 22 and a high reluctance gap is defined between the rotor 18 and the disk 24. The low reluctance gap defined between the rotor 18 and the disk 22 provides a shunt path 54 for the flux from the magnet 14 and a generating path 56 for the magnet 16. Some flux from the permanent magnet 16 will follow the high reluctance path 58 including the high reluctance gap between the disk 24 and the rotor 18. As the rotor 18 is rotated, the teeth 52 then become aligned with the teeth 48 of the disk 24. A low reluctance gap is then defined between the disk 24 and the rotor 18 and a high reluctance gap is defined between the disk 22 and the rotor 18. The low reluctance gap defined between the rotor 18 and the disk 24 provides a shunt path 60 for the magnet 16 and a generating path 62 for the magnet 14. Some flux from the magnet 14 will follow the path 64 including the high reluctance gap between the disk 22 and the rotor 18.

As can be seen, the generating flux paths 56 and 62 are in opposite directions around the coil 12. Therefore, as the rotor 18 rotates, the alternating flux around the coil 12 through the generating paths 56 and 62 induces an alternating voltage in the coil 12 which appears on the terminal 34, which voltage has a frequency corresponding to the rotation of the rotor 18. In addition, as can be seen, the average flux through the generating path is zero thereby allowing a decrease in the quantity of the metal forming the generating paths.

The flux through the low reluctance gaps as alternately defined by the rotor 18 and the disks 22 and 24 is less than the flux through the shunt path on the single magnet alternate path device as a result of the decreased size of the magnets, reluctance of the generating paths, and the flux which follows the path which includes the high reluctance gaps as alternately defined between the rotor and the disks 22 and 24. This minimizes the problem of tooth tip saturation and, therefore, increased the magnitude of the signal generated. In addition, the peak flux in each disk 22 and 24 and in the generating paths is lower than in the single magnet alternate path device. This factor permits a significant decrease in the quantity of flux carrying metal, fewer coil turns, and higher output in a smaller size signal generator.

What is claimed is:

1. A signal generator comprising, in combination, a coil, a first magnetic flux source, a flux path for the first magnetic flux source including a first variable reluctance flux path in parallel with the series combination of the coil and a second variable reluctance flux path, a second magnetic flux source, a flux path for the second magnetic flux source including the second variable reluctance flux path in parallel with the series combination of the coil and the first variable reluctance flux path, the direction of the magnetic flux through the coil from the first and second magnetic flux sources being in an opposing relationship, and means for cyclically varying the reluctance of the first and second variable reluctance flux paths in an inverse relationship for cyclically varying the magnetic flux through the coil to induce a corresponding voltage therein.

2. A signal generator comprising, in combination, a coil; a first magnetic flux source; a second magnetic flux source; a first variable reluctance flux path including a first circular member having teeth space on a surface thereof and a second circular member having teeth confronting the teeth on the first circular member; a second variable flux path including a third circular member having teeth spaced on a surface thereof and the second circular member having its teeth confronting the teeth on the third circular member; a flux path for the first magnetic flux source including the first variable reluctance flux path in parallel with the series combination of the coil and the second variable reluctance flux path; a flux path for the second magnetic flux source including the second variable reluctance flux path in parallel with the series combination of the coil and the first variable reluctance flux path, the direction of the magnetic flux through the coil from the first and second magnetic flux sources being in an opposing relationship; and means for cyclically varying the reluctance of the first and second variable reluctance flux paths in an inverse relationship for cyclically varying the magnetic flux through the coil to induce a corresponding voltage therein.

3. The signal generator as claimed in claim 2 wherein the teeth on the first circular member are out of phase with the teeth on the third circular member.

4. The signal general as claimed in claim 3 wherein the first and third circular members are stationary with respect to one another, the first and third circular members and the second circular member are mounted for relative rotation, and the means for cyclically varying the reluctance of the first and second variable reluctance flux paths in an inverse relationship includes means for producing relative rotation between the first and third circular members to cause the teeth on the first and third circular members to alternately cooperate with the teeth on the second circular member.

5. A signal generator comprising, in combination, means defining a first magnetic flux path including two opposed balance magnetic flux sources and a coil through which the flux path extends, means defining two shunt flux paths each connected across a respective flux source and bypassing the coil and means for cyclically inversely varying the reluctance of the shunt paths to cyclically vary the magnetic flux through the coil and induce an alternating voltage therein.